United States Patent [19]

Porta

[11] 4,235,297
[45] Nov. 25, 1980

[54] TWO-MAN UTILITY VEHICLE

[75] Inventor: Frank T. Porta, Charleston, W. Va.

[73] Assignee: HPS Company, Inc., Charleston, W. Va.

[21] Appl. No.: 22,710

[22] Filed: Mar. 22, 1979

[51] Int. Cl.³ .................. B62D 11/04; F15B 13/06
[52] U.S. Cl. .............................. 180/6.48; 60/420; 91/521; 180/317
[58] Field of Search .............. 180/6.48, 77 MC, 6.2; 91/521, 530; 60/420; 74/471 XY

[56] References Cited

U.S. PATENT DOCUMENTS

| 3,129,781 | 4/1964 | Stein | 180/6.48 |
|---|---|---|---|
| 3,876,020 | 4/1975 | Barsby | 180/6.48 |
| 3,891,042 | 6/1975 | Braun | 180/6.48 |
| 3,891,045 | 6/1975 | Pancella | 180/6.48 |
| 4,036,321 | 7/1977 | Habiger | 180/6.48 |
| 4,076,090 | 2/1978 | Krusche et al. | 180/6.48 |
| 4,085,812 | 4/1978 | Robinson et al. | 180/6.48 |
| 4,163,413 | 8/1979 | Kennicutt | 180/6.48 |

Primary Examiner—John J. Love
Attorney, Agent, or Firm—Sigalos & Levine

[57] ABSTRACT

A hydraulically driven utility vehicle comprising hydraulically operated, reversible propulsion means on each side of said vehicle, a source of hydraulic fluid contained on said vehicle, a first hydraulic flow control valve coupled between said hydraulic source and said propulsion means on one side of said vehicle, a second hydraulic flow control valve coupled between said hydraulic source and said propulsion means on the other side of said vehicle, and a control stick hydraulically coupled to said first and second flow control valves for controlling vehicle speed and direction by selectively positioning said first and second control valves whereby movement of said stick causes said flow control valves to direct hydraulic fluid from said source to said propulsion means to control speed and steering of said vehicle.

7 Claims, 4 Drawing Figures

TWO-MAN UTILITY VEHICLE

BACKGROUND OF THE INVENTION

1. Field of the Invention

The present invention relates particularly to a two-man underground utility vehicle for particular use in the coal industry, and which incorporates a hydraulic type, four-wheel drive, skid steer propulsion system controlled by a single lever or "joystick" in the passenger area.

2. Brief Description of the Prior Art

In many mines the areas being worked are narrowly confined; i.e., have low ceilings and side walls closely spaced, and uneven and muddy floors. This has made difficult the use of vehicles to remove miners quickly and safely to and from such areas. Heretofore, no vehicle has been able to function satisfactorily in such conditions and, particularly, to meet the certification requirements of the M.S.H.A. Approval and Certification Center.

Prior art utility vehicles that utilize a single lever or joystick for controlling steering have mechanical linkage to facilitate operation of a four-way valve or a variable volume axial type piston pump to deliver hydraulic pressure to the propulsion means. These configurations create problems in utility vehicles for use in coal mine or underground operations. The vehicles are not sufficiently compact, low in height and easily maneuverable. Mechanical linkage between the joystick and four-way valves or variable volume, axial type piston pumps not only require greater area for installation, but also require considerable maintenance. Further, prior art utility vehicles of this type are not four-wheel drive type but generally utilize drive tracks or are three-wheeled devices which require more power and are subject to getting stuck or "hung up" in soft terrain prevalent in mines.

SUMMARY OF THE INVENTION

The present invention overcomes the disadvantages of the prior art by providing a utility vehicle which is compact and low in height for use in underground operations such as a coal mine, is hydraulically driven, has a four-wheel drive, is easily maneuverable with a single joystick control which controls both speed and direction of the vehicle, and has dynamic braking to provide a smooth stop when the joystick is released and allowed to assume its neutral position.

Briefly stated, the present invention relates to a hydraulically driven utility vehicle especially suited for underground mine operations comprising hydraulically operated, reversible propulsion means on each side of said vehicle, a source of hydraulic fluid contained on said vehicle, a first hydraulic fluid control valve coupled between said hydraulic source and said propulsion means on one side of said vehicle, a second hydraulic flow control valve coupled between said hydraulic source and said propulsion means on the other side of said vehicle, and a control stick hydraulically coupled with said first and second flow control valves for controlling vehicle speed and direction and selectively positioning said first and second flow control valves whereby movement of said stick causes said flow control valves to direct hydraulic fluid from said source to said propulsion means to control speed and steering of said vehicle.

DETAILED DESCRIPTION

In order to operate the utility vehicle underground, and, in particular, in a coal mine, the vehicle must not only be of rugged construction, but must be low in height, easily maneuverable, free from emitting noxious gasses, and very powerful.

Figure 1:
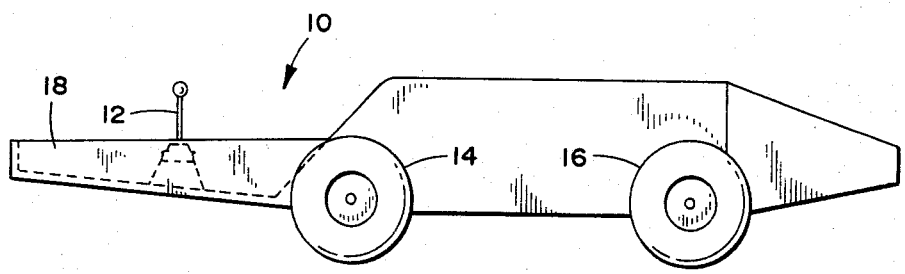
FIG. 1 is a side view of the utility vehicle of the present invention.

FIG. 1 is a side view of the novel utility vehicle to the present invention. In this preferred embodiment, it is approximately 72" in width from outer wheel to outer wheel, approximately 125" in length and approximately 26" in height. It has a passenger compartment 10 for holding two individuals, a control stick or "joystick" 12 for both steering the vehicle, as well as governing the speed thereof. It will be evident that where particular mines are of a structure to permit the same, longer length vehicles can be used so as to hold three, four or more miners. The direction in which the stick is moved controls the direction the vehicle travels and the amount of movement of the joystick controls the speed of the vehicle. It has a four-wheel drive with only two wheels 14 and 16 shown in FIG. 1. It will be noted that the passenger compartment 10 is recessed thus allowing the passengers to sit down inside the vehicle with wall 18 providing a measure of protection for the body.

Figure 2:
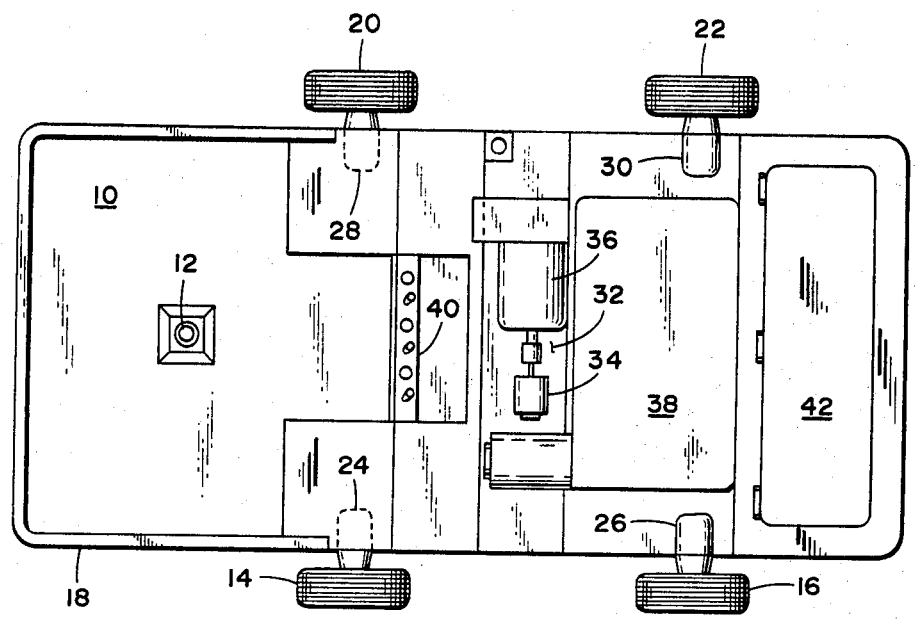
FIG. 2 is a top view of the utility vehicle of the present invention illustrating the location of the major components.

FIG. 2 is a top view of the novel utility vehicle illustrating the relationship of the passenger compartment 10 and the remainder of the utility vehicle. Control stick 12 is mounted in the center of the passenger compartment for easy access by either of the passengers so that the vehicle can be conveniently steered and controlled. Each of the wheels 14, 16, 20, and 22 are hydraulically driven by a respective hydraulic motor 24, 26, 28, and 30. The hydraulic wheel motors 24, 26, 28 and 30 receive the hydraulic fluid from a hydraulic reservoir 32. A hydraulic pump 34 is driven by an electric motor 36 to pump the fluid from reservoir 32 to the hydraulic wheel motors. A power source such as a 245 amp/hour battery 38 or series of batteries may be stored in a compartment and used to power electric motor 36. A control panel 40 may be provided with a gauge for remaining battery capacity, switches for starting the electric motor and for lights. If desired, a panic bar may be mounted in any convenient location in the passenger compartment which, when operated by a passenger, would act as an emergency device to stop the vehicle. A tool tray 42, either open or provided with a cover, may be located at the rear of the utility vehicle.

Figure 3:
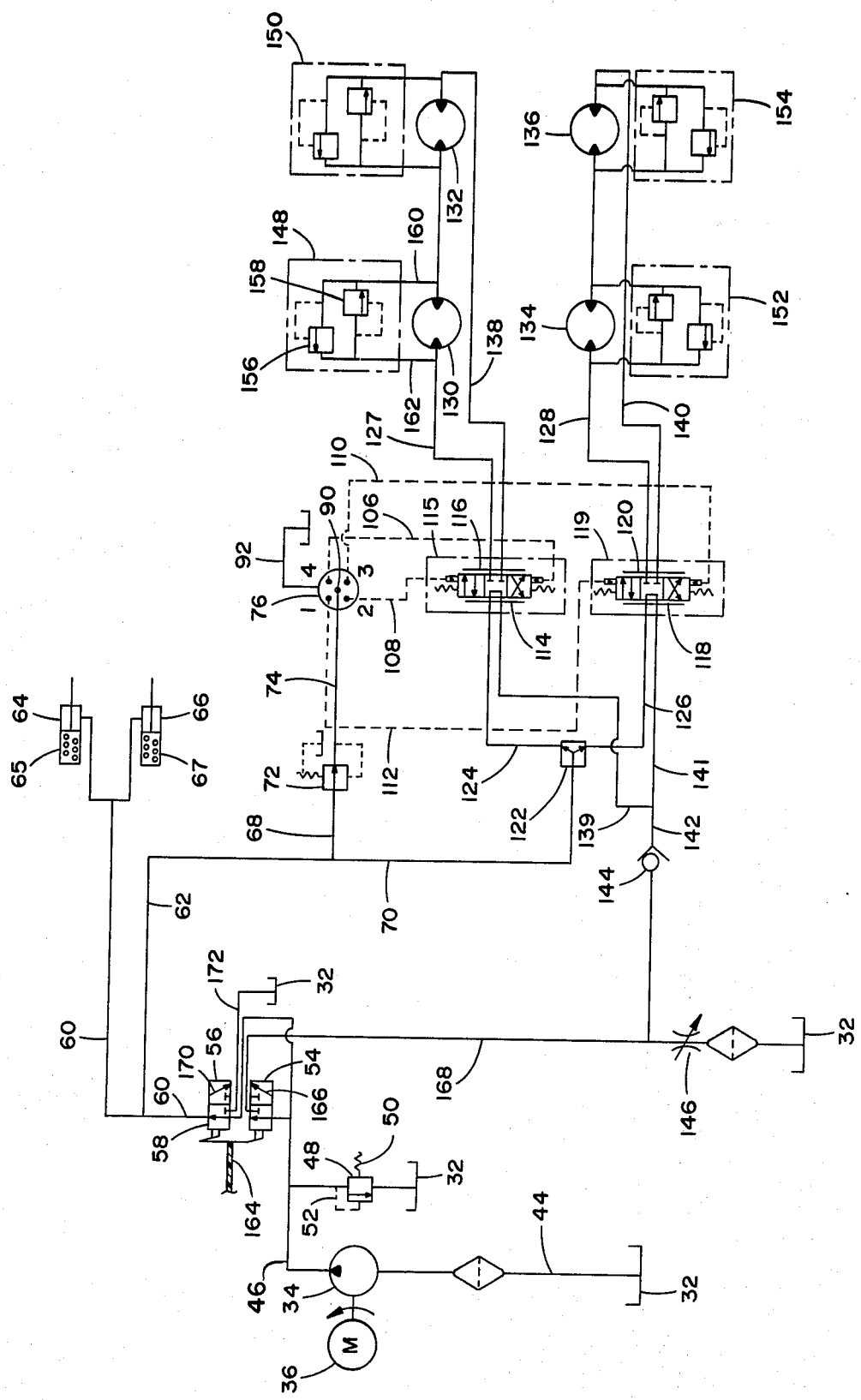
FIG. 3 is a schematic of the hydraulic system utilized in the utility vehicle of the present invention.

FIG. 3 is the schematic diagram of the hydraulic system for controlling the novel personnel vehicle. Hydraulic pump 34 is driven by electric motor 36 to draw hydraulic fluid from reservoir 32 through conduit 44 and apply it under pressure of several thousand pounds per square inch to conduit 46. Coupled to conduit 46 is a main relief valve 48 whose pressure is adjustable and is normally set at approximately 3300 PSIG. If the pressure produced by pump 34 exceeds 3300 PSIG, main relief valve 48 opens and dumps the hydraulic fluid back to reservoir 32. As indicated by spring 50 and dashed line 52, the main relief valve is adjustable and can be set to operate at any desired pressure.

The output of hydraulic pump 34 in conduit or hose 46 is also coupled to both sides 54 and 56 of emergency dump valve 58. In the normal operating mode, the hydraulic pressure in hose 46 is coupled to side 56 of dump valve 58 where it passes through side 56 on hose 60. At that point, it is coupled to hoses 60 and 62. The pressure in hose 60 is coupled to the parking brake cylinders 64 and 66. These brakes may be of the disc type, shoe type, or simply an appropriately constructed plate which is forced by springs 65 and 67 to rest against the tires or brake drums of the vehicle to prevent the wheels from turning. When the hydraulic pump 34 is started by motor 36 and hydraulic pressure is built up in the system, the hydraulic pressure in hose 60 is used to overcome the spring tension which is holding the brakes in the "on" position, and thus releases them automatically. The pressure built up in hose 62 is also coupled to hoses 68 and 70. The hydraulic fluid in hose 68 passes through a pressure reducing valve 72 which reduces the pressure in the lines to approximately 125 PSIG. Again, this valve pressure setting is adjustable and may provide any desired pressure. The output of pressure reducing valve 72 is coupled on hose 74 to joystick pilot valve 76.

Figure 4:
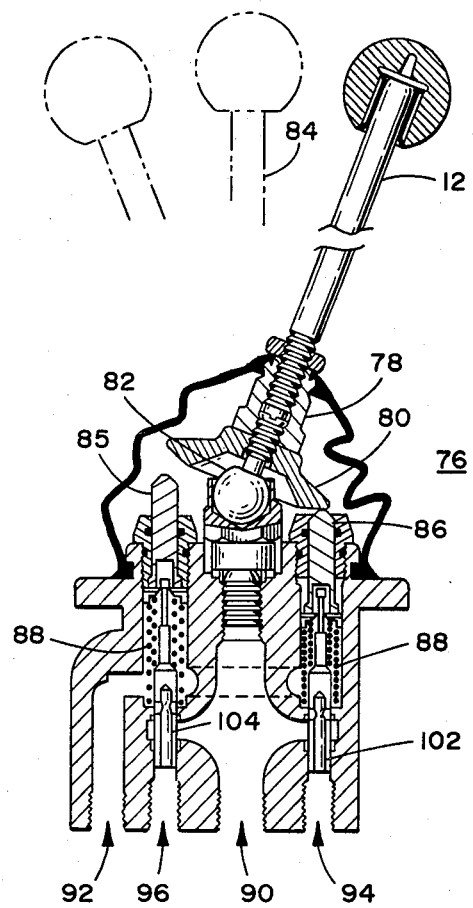
FIG. 4 is a cross-sectional view of a single control lever integrally formed with the flow control valves in the utility vehicle of the present invention.

FIG. 4 is a cross sectional view of the joystick pilot valve 76. The control stick 12 is threaded into or otherwise attached to a bracket 78 attached to a cam plate 80. Cam plate 80 is also threadedly attached to a ball joint 82 and, when the control stick 12 is in its neutral position 84, cam plate 80 rests on four plungers, two of which, 85 and 86, are shown in FIG. 4. These plungers are spring-loaded in the upper position by springs 88. Four of such spring-loaded plungers hold control stick 12 in its neutral position 84 under static conditions. Under these conditions, the hydraulic fluid from pressure reducing valve 72 on hose 74 is coupled into port 90 and, since the plungers are in their neutral position, the hydraulic fluid passes through spools 102 and 104 attached to the plungers to output port 92 where it returns to the hydraulic reservoir. If, however, the control stick 12 is moved to a position as shown in FIG. 4, the hydraulic fluid entering port 90 passes through spool 102 of plunger 86, which is depressed, and out port 94 to an appropriate 4-way hydraulic control valve which in turn directs hydraulic fluid at system pressure (3300 PSIG) to the hydraulic motors on the drive wheels for a particular desired side. The returning hydraulic fluid from the pilot ports of the 4-way hydraulic control valves to the pilot valve 76 enters port 96, passes through spool 104 of plunger 85 and back through port 92 to the hydraulic reservoir. The other two ports, not shown, and associated plungers operate in a similar manner. Thus, since the control lever 12 pivots about a ball 82 or knuckle joint, movement of the lever 12 permits the operation of one or two of the plungers simultaneously.

Returning again to FIG. 3, dashed lines 106, 108, 110, and 112 are schematic representations of the hydraulic lines having a fluid flow & pressure controlled by plungers such as 84 and 86 shown in FIG. 4. Hydraulic lines 106, 108, 110 and 112 are coupled to the fluid transfer spools of valves 115, and 119 shown in FIG. 3. In FIG. 3, assume that the front of the vehicle is to the left and that to go forward the control stick must be moved forward or to the front of the vehicle. In this position, cam plate 80, shown in FIG. 4, depresses the plungers coupled to and controlling hydraulic pilot lines 108 and 112 which position the spools of associated valves 115 and 119 in FIG. 3 to positions 116 and 120. In so doing, the hydraulic fluid in hose 70 passes through flow divider 122 to hoses 124 and 126, through the 4 way directional flow control valves in positions 116 and 120 to hoses 127 and 128 respectively and is coupled to hydraulic motors 130 and 132 driving the right wheels and hydraulic motors 134 and 136 driving the left wheels. The hydraulic fluid, after passing through the hydraulic motors, returns on hoses 138 and 140 to 4 way directional flow control valves 115 and 119 respectively, which are still in positions 116 and 120 respectively, and is allowed to pass to return hose 142 through one-way check valve 144 and regulator 146 back to the reservoir 32. Thus, the vehicle is moving in the forward direction. The pilot valve shown in FIG. 4 and control valves 115 and 119 are constructed for proportional fluid flow so that the further the control stick is moved, the greater the flow of hydraulic fluid to the hydraulic wheel motors and thus, the greater the speed at which the device will travel.

In like manner, assuming that it is desired to move the vehicle in reverse, the control stick 12 is moved backwards (to the right in FIG. 3), thus depressing plungers controlling the hydraulic fluid flow and pressure in hydraulic pilot lines 106 and 110, represented by dashed lines in FIG. 3, to allow the hydraulic fluid entering the 4 way directional control valves to pass through the spools of control valves 115 and 119, in positions 114 and 118, on hoses 138 and 140 which thus drive the hydraulic motors 130 and 132 on the right side and 134 and 136 on the left side in reverse. Thus, the vehicle moves to the rear.

If it is desired to spin the vehicle to the left about its vertical axis, the control stick is moved downwardly in FIG. 3 thus depressing plungers controlling hydraulic fluid flow and pressure in lines 108 and 110 as represented by the corresponding dashed lines in FIG. 3. The spool of control valve 115 is thus shifted to position 116 to couple hydraulic fluid to hydraulic motors 130 and 132 on the right side to drive them in a forward direction. At the same time, the spool of associated control valve 119 is shifted to position 118 so as to allow the incoming hydraulic fluid on hose 126 to be coupled to hydraulic motors 134 and 136 on the left side of the vehicle through hydraulic hose 140 thus operating or driving the left wheels in reverse. Consequently, with the wheels on the right side of the vehicle moving in a forward direction, and the wheels on the left side of the vehicle moving in a reverse direction, the vehicle spins to the left about its vertical axis. In like manner, if it is desired to spin the vehicle to the right about its vertical axis, the control stick is moved upwardly in FIG. 3 thus causing a reverse action. Hydraulic fluid in line 112 then causes the spool of control valve 119 to be activated in position 120 thus driving the left wheels in the forward direction while hydraulic fluid in line 106 positions the spool of valve 115 in position 114 which causes the right wheels to be moved in the reverse direction. Thus, the vehicle spins to the right.

It will be obvious from FIG. 3 and FIG. 4 that if the control stick 12 is moved in any direction other than parallel or perpendicular to the longitudinal axis of the vehicle, that more or less hydraulic flow will be applied to one or the other sets of hydraulic wheel motors on each side, thus causing the vehicle to be moved in the direction that the control lever 12 is moved. Thus, if the control stick is moved forward (to the left in FIG. 3), and to the right (slightly upwardly in FIG. 3), the plunger controlling hydraulic line 112 will be depressed a slightly greater distance than the plunger controlling hydraulic line 108, thus allowing more hydraulic fluid to pass through the spool of control valve 119 in position 120 than passes through the spool of control valve 115 in position 116. Therefore, the wheels on the left side of the vehicle driven by hydraulic motors 134 and 136 will turn faster than the wheels on the right side of the vehicle being driven by hydraulic motors 130 and 132. Thus, the vehicle has a tendency to turn to the right. The sharper the control stick is moved to the right (or upwardly in FIG. 3), the faster the vehicle will move to the right. The more the control stick 12 is moved to the left (or downwardly in FIG. 3), the more the vehicle will turn to the left.

Cross-over relief valves 148, 150, 152, and 154 are coupled to hydraulic motors 130, 132, 134, and 136 respectively. These cross-over relief valves provide dynamic braking for the vehicle. Without these valves, it will be understood that if the vehicle were suddenly stopped, and the hydraulic pressure was prevented from flowing from the hydraulic wheel motors, the hydraulic wheel motors could not turn although the wheels would try to drive them and great pressures would build up in the hydraulic lines. The cross-over relief valves prevent this problem. Each cross-over relief valve has a forward valve 156 and a reverse valve 158 therein. Each of these valves is also adjustable to a desired pressure. If hydraulic motor 130 is turning in the forward direction, for instance, and the control stick is allowed to assume its neutral position, all hydraulic fluid flow to and from the hydraulic motors is stopped. However, in this instance, the wheel driving hydraulic motor 130 causes the fluid to be pumped by the hydraulic motor 130 and pass through hose 160 to valve 156 where it passes through valve 156 and back on hose 162 to hydraulic motor 130. Thus, the hydraulic motor 130 simply circulates the fluid in that loop as it is driven by its corresponding vehicle wheel until all power is dissipated through losses in vehicle movement and frictional losses. Thus, the vehicle comes quickly and smoothly to a stop. In like manner, if the vehicle is moving in reverse and all hydraulic power is stopped to the hydraulic motors, hydraulic motor 130, being driven by its corresponding vehicle wheel, would simply pump the fluid through hose 162, valve 158 and hose 160, and would continue to circulate the fluid in that path until the vehicle comes to a smooth stop. The other cross-over valves attached to each of the other hydraulic drive motors functions in a similar manner. Thus, dynamic braking is automatically provided for the vehicle with the use of the cross-over relief valves 148, 150, 152, and 154.

If desired, a panic bar 164 may be attached to any convenient place on the vehicle where either of the passengers can easily reach it. In cases of emergency, the passenger would operate or depress panic bar 164 which would reposition dump valve 58 from the position shown in FIG. 3. When operated thusly, conduit 166 on side 54 of dump valve 58 then connects the hydraulic fluid on hose 46 to hose 168 which returns the hydraulic fluid through regulator valve 146 back to reservoir 132. Thus, the panic bar simply bypasses the hydraulic system in the vehicle and returns the pressure from pump 34 back to reservoir 32. However, it also provides emergency braking inasmuch as when the panic bar 164 is operated, conduit 170 on side 56 of dump valve 58 then connects hose 60 from the park brake to hose 172 which returns to the reservoir 32. Thus, the pressure is removed from hose 60 allowing the spring loaded parking brake cylinder to operate and apply the brakes to the wheels, thus bringing the vehicle to an emergency stop.

Thus, it can be seen that with the joystick pilot valve as shown in FIG. 4 only simple hoses are needed to connect the low pressure fluid from the pilot valve 76 to the appropriate 4-way flow control valves which regulate fluid flow to the hydraulic drive motors. This allows the control stick to be placed in the forward part of the vehicle in the passenger compartment which allows very compact construction of the vehicle. Further, with this particular type of pilot valve which may be a Rexroth Pilot Valve, Type TH8, very little maintenance is required and total control of the vehicle in both speed and direction is maintained by the operation of the single joystick or control stick.

For optimum durability and protection of the passengers, the structural elements are made of steel.

Thus, there has been disclosed a novel and unique utility vehicle which may be used in underground operations such as coal mining wherein a small, compact, easily controlled, powerful device is required. The device emits no noxious fumes, is easily maneuverable and has emergency braking and dynamic braking, both of which are required in mining operations.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:
1. A hydraulically driven utility vehicle comprising:
   a. hydraulically operated, reversible propulsion means on each side of said vehicle,
   b. a source of pressurized hydraulic fluid contained on said vehicle,
   c. a first hydraulic flow control valve coupled between said hydraulic source and said propulsion means on one side of said vehicle,
   d. a second hydraulic flow control valve coupled between said hydraulic source and said propulsion means on the other side of said vehicle, and
   e. a control stick hydraulically coupled to said first and second flow control valves for controlling vehicle speed and direction of steering by selectively positioning said first and second flow control valves whereby movement of said stick causes said flow control valves to proportionally direct hydraulic fluid from said source to said propulsion means to control speed and steering of said vehicle.
2. A vehicle as in claim 1 wherein said propulsion means comprises:
   a. first and second hydraulically driven wheel motors on each side of said vehicle, and
   b. means for serially coupling the hydraulic fluid flow from one wheel motor on each side to the other wheel motor on the same side whereby both wheel motors on the same side are driven by the same hydraulic fluid.
3. A vehicle as in claim 2 further including:

a. a cross-over relief valve coupled to each hydraulic wheel motor to provide dynamic braking whereby when the hydraulic pressure is removed from said hydraulic wheel motors, each of said wheels becomes a motor driving its associated wheel motor as a pump and forcing hydraulic fluid to circulate between said cross-over relief valve and said hydraulic wheel motor thereby causing a gradual braking of said vehicle.

4. A vehicle as in claim 1 wherein each of said first and second hydraulic flow control valves comprises:
   a. first and second input ports for receiving hydraulic fluid from and returning hydraulic fluid to said hydraulic source,
   b. first and second output ports for transferring hydraulic fluid to and receiving hydraulic from said propulsion means, and
   c. a fluid transfer spool operated by said stick movement and having a first neutral position thereby blocking any flow of hydraulic fluid from said source to said propulsion means, a second forward position for allowing a flow of hydraulic fluid to drive said propulsion means to obtain forward movement of said vehicle and a third reverse position for allowing a flow of hydraulic fluid to drive said propulsion means to obtain reverse movement of said vehicle.

5. A vehicle as in claim 4 wherein:
   a. said first and second hydraulic control valves are proportional control valves allowing an amount of hydraulic fluid to be coupled between said input and output ports in proportion to the movement of said fluid transfer spool whereby a small movement of said transfer spool allows a small amount of hydraulic fluid to be coupled between said input and output ports and a larger movement of said transfer spool allows a larger amount of hydraulic fluid to be coupled between said input and output ports thereby moving said vehicle at a speed proportional to the amount of control stick deflection.

6. A vehicle as in claim 4 further including: means coupling said control stick to said fluid spools whereby forward movement of said control stick places both of said fluid transfer spools in said second forward position, backward movement of said conrol stick places both of said fluid transfer spools in said third reverse position, movement of said control stick at right angles to said vehicle longitudinal axis simultaneously positions one of said hydraulic control valves in said second forward position and the other hydraulic control valve in said third reverse position whereby the wheels on opposite sides of said vehicle are driven in opposite directions thereby causing said vehicle to spin about a vertical axis, and movement of said control stick in any direction other than parallel or transverse to said vehicle longitudinal axis provides more hydraulic fluid to the hydraulic drive motors on that side of said vehicle toward which the control stick is moved than the other whereby direction of movement of said vehicle corresponds to the direction of movement of said control stick.

7. A utility vehicle for use in underground coal mining operations comprising:
   (a) a body portion low in height to enable use of the vehicle in an underground mining operation,
   (b) at least first and second propulsion means on each side of said body portion,
   (c) a reversible hydraulic motor coupled to each said propulsion means,
   (d) a source of pressurized hydraulic fluid contained on said vehicle body portion,
   (e) means for serially coupling the hydraulic fluid flow from one hydraulic motor on each side of said vehicle to the other hydraulic motor on the same side whereby said first and second hydraulic motors on the same side are driven by the same hydraulic fluid,
   (f) a first hydraulic control valve having input ports connected to said hydraulic source and output ports connected to said serially coupled hydraulic motors on one side of said vehicle,
   (g) a second hydraulic control valve having input ports connectd to said hydraulic source and output ports connected to said serially coupled hydraulic motors on the other side of said vehicle,
   (h) a hydraulically positioned fluid transfer spool in each of said control valves for selectively directing hydraulic fluid to and from said hydraulic motors thereby controlling vehicle speed and direction, and
   (i) a control stick having a pilot valve with an input port and output ports, said input port being connected to said hydraulic source and said output ports being connected to each of said fluid transfer spools in said control valves whereby movement of said control stick causes hydraulic fluid to position said fluid transfer spools to allow selective transfer of hydraulic fluid to said hydraulic motors to control vehicle speed and direction.

* * * * *